United States Patent

Kumar et al.

Patent Number: 6,023,767
Date of Patent: Feb. 8, 2000

[54] METHOD FOR VERIFYING HOLD TIME IN INTEGRATED CIRCUIT DESIGN

[75] Inventors: Sudarshan Kumar, Fremont; James J. C. Lan, San Jose; Rajesh Manglore, Santa Clara, all of Calif.

[73] Assignee: Intel Corporation, Santa Clara, Calif.

[21] Appl. No.: 08/841,839

[22] Filed: May 5, 1997

[51] Int. Cl.⁷ .................................................. G06F 1/04
[52] U.S. Cl. .......................... 713/400; 713/401; 713/503
[58] Field of Search .................................. 713/400, 401, 713/500, 503, 600; 395/500.03, 500.07, 500.09, 500.2

[56] References Cited

U.S. PATENT DOCUMENTS

| | | | |
|---|---|---|---|
| 5,175,447 | 12/1992 | Kawasaki et al. | 327/211 |
| 5,726,596 | 3/1998 | Perez | 327/292 |
| 5,761,097 | 6/1998 | Palermo | 702/79 |
| 5,812,708 | 9/1998 | Rao | 385/14 |

*Primary Examiner*—Dennis M. Butler
*Attorney, Agent, or Firm*—Blakely, Sokoloff, Taylor & Zafman LLP

[57] ABSTRACT

A method for verifying proper communication between a first circuit and a second circuit of an electronic device. First it is determined which global clocks the first circuit and the second circuit are timed by. Then, the clock signal is shifted between the first and second storage circuits by an amount equal to or greater than a global clock skew budget of the device if it is determined that the first and second storage circuits are timed by different global clocks. Finally, verifying proper operation of the second circuit against a local clock skew budget of the device is done.

11 Claims, 2 Drawing Sheets

METHOD FOR VERIFYING HOLD TIME IN INTEGRATED CIRCUIT DESIGN

FIELD OF THE INVENTION

The present invention relates to integrated circuits and more particularly to a method for verifying hold time in the design of an integrated circuit.

BACKGROUND OF THE INVENTION

Electronic devices, such as processors, memory components, controllers, signal converters, and other integrated circuits (ICs) are commonly found in electronic systems such as desktop, mobile, and hand-held computers. These electronic devices contain storage circuits, such as latches, flip-flops, and registers, that are connected to each other by signal lines that enable one storage circuit to communicate with another. Signal lines carry different types of signals such as data and clock signals. A data signal line carries data signals, including, for example, address, data, or control information, and a clock signal line carries clock signals. A clock signal is a signal that controls the operation of a circuit by synchronizing the time intervals during which data signals can be communicated from one storage circuit to another.

It is important that a data signal from a first storage circuit to a second, sequential storage circuit, traveling along a data signal line, is delayed long enough to ensure that the data signal does not reach the second storage circuit before the clock signal to the second storage circuit properly gates the data signal at the input to the second storage circuit. Otherwise, data may be lost. Delay on the data signal line is increased by, for example, placing delay elements, such as inverters, logic gates, or other buffers, on the data signal line to impede the path of the data signal communicated along the data signal line.

It is important that the number of delay elements placed on the data signal line to delay the data signal is not so excessive that the data signal is delayed much beyond the minimum amount of time that is necessary to preserve data integrity because excess delay elements needlessly increases the size and cost of the electronic device. In addition, the speed of communication between the two sequential storage circuits will be unduly slowed by excess delay elements, potentially slowing the speed of the electronic device.

The proper balance must be struck between increasing the delay on the data signal line between a first storage circuit and a second storage circuit to delay the data signal to allow the clock signal enough time to properly gate the second storage circuit, versus reducing the number of delay elements on the data signal line to increase the speed of communication and reduce needless circuitry between the two storage circuits. Striking the proper balance between these two competing interests serves to both improve the reliability and reduce the size of the overall electronic device. In doing so, the reliability and size of electronic systems, such as computers, is improved, and cost is reduced.

It is the job of the circuit designer to verify proper communication between two sequential storage circuits by ensuring that the data signal on the data signal line between the two storage circuits is delayed long enough to preserve data integrity. This verification is typically done during circuit simulations, before the electronic device is actually manufactured. Because this verification is done during simulation, the exact amount of delay that is minimally necessary to ensure proper communication between two circuits cannot be known, and is therefore estimated based on the layout of the circuit, the frequency of the clock, the manufacturing process, and other factors. Verifying that the proper amount of data signal delay is included on a data signal line between two circuits to ensure proper communication and to preserve data integrity between the two circuits is called minimum delay or "mindelay" checking or verification, or "hold time" checking or verification.

Estimating the minimum delay time necessary to ensure proper communication between two circuits can be difficult. If the minimum delay time selected is overly conservative or pessimistic (i.e. the minimum delay time is too long), the data signal line between the two circuits will be designed with too many delay elements, thereby needlessly increasing the size and cost of the electronic device. However, if the minimum delay time selected is too short (or optimistic), the data signal line between the two circuits will be designed with too few delay elements, making the data signal too fast, thereby reducing data integrity and causing the electronic device to malfunction. What is desired is a methodology for verifying proper communication between two, sequential, timed, circuits that strikes a proper balance between these two competing interests.

SUMMARY OF THE INVENTION

A method for verifying proper communication between a first circuit and a second circuit of an electronic device is described. First it is determined which global clocks the first circuit and the second circuit are timed by. Then, the clock signal is shifted between the first and second storage circuits by an amount equal to or greater than a global clock skew budget of the device if it is determined that the first and second storage circuits are timed by different global clocks. Finally, verifying proper operation of the second circuit against a local clock skew budget of the device is done.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method for verifying proper communication between a first storage circuit and a second storage circuit of an electronic device is described wherein the first storage circuit is controlled by, or timed by, a first clock signal and the second storage circuit is timed by a second clock signal. During the hold time checking of the storage circuit design it is first determined which global clocks the first and second clock signals are tapped from.

If the first and second clock signals are tapped from different global clocks, the clock signal is shifted by the global clock skew budget of the electronic device. If, however, the first and second clock signals are tapped from the same global clock, then no clock shifting is done. The second clock signal is time shifted with respect to the first clock signal (i.e. the clock signals between the two circuits are time shifted with respect to each other).

Verification of proper operation of the second storage circuit is then conducted against the local clock skew budget. Verification of proper operation of the second storage circuit may include the insertion of delay elements, such as inverters or other buffers, on the data signal line between the two circuits to ensure that proper signal timing is achieved, and to ensure that data integrity is preserved. After this verification, communication between the first and second storage circuits will proceed correctly with respect to hold time requirements.

A more detailed description of the present invention, including various configurations and implementations in accordance with alternate embodiments of the present invention, is provided below.

Figure 1:
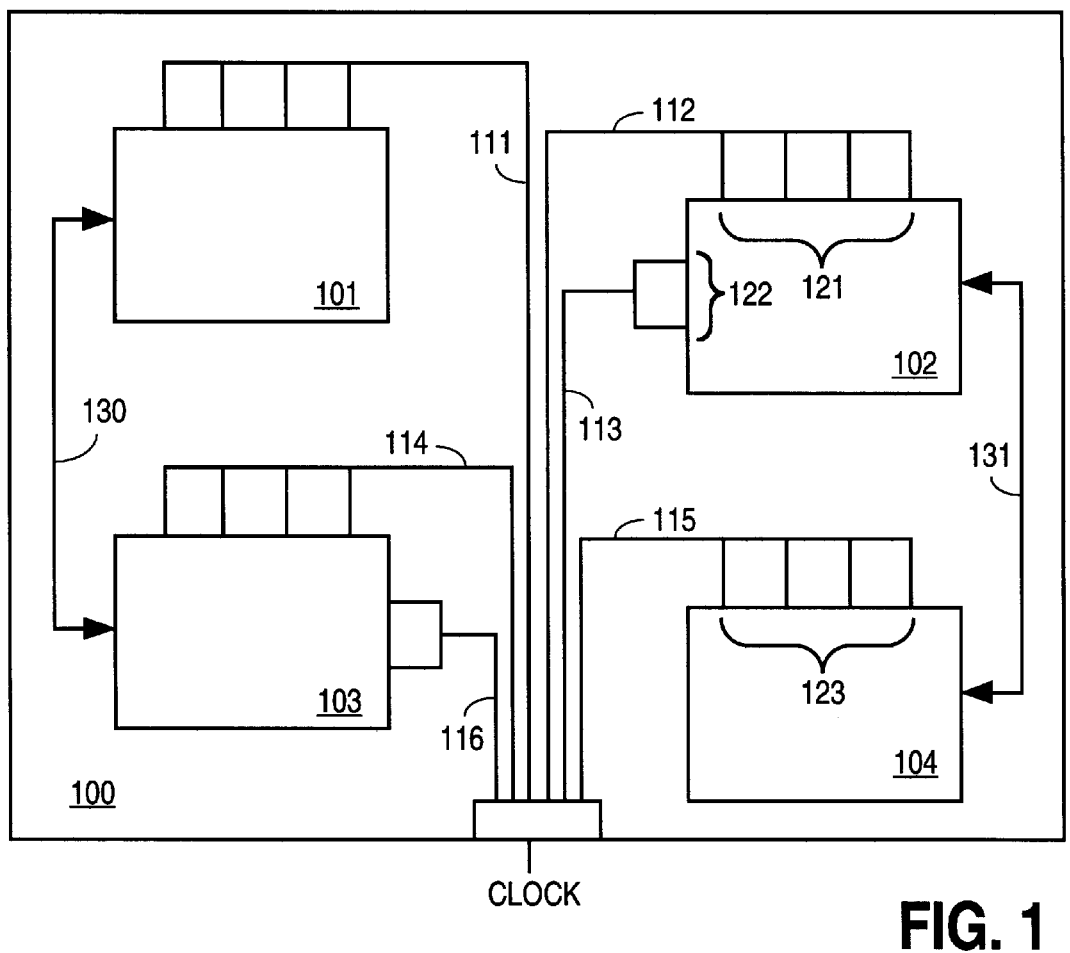
FIG. 1 is a processor having functional unit blocks and clock signal lines in accordance with an embodiment of the present invention.

FIG. 1 is a processor having functional unit blocks and clock signal lines in accordance with one embodiment of the present invention. Processor 100 receives a clock input signal, as shown, modifies and buffers the signal to create global clock signals, and distributes the global clocks along global clock signal lines 111–116. The global clock signals are communicated, via the global clock signal lines, to functional unit blocks (FUBs) 101–104 such that global clock signal line 111 provides a global clock signal to FUB 101, global clock signal lines 112 and 113 provide global clock signals to FUB 102, global clock signal lines 114 and 116 provide global clock signals to FUB 103, and global clock signal line 115 provides a global clock signal to FUB 104. FUB 101 communicates with FUB 103 via signal line 130 and FUB 102 communicates with FUB 104 via signal line 131.

The clock input signal received by processor 100 of FIG. 1 is the system clock of the computer system in which processor 100 resides. Because the system clock signal is typically much slower than the speed at which the processor operates, the system clock input signal is stepped up to a faster speed using a phase locked loop. The clock signal is then divided into several global clock signals, strengthened by various clock drivers, and is distributed throughout processor 100 to the various functional unit blocks 101–104 via individual global clock signal lines. For an alternate embodiment of the present invention, the clock input signal is another type of clock signal that synchronizes the processor input and output data signals to other electronic devices in a system. For one embodiment, the processor generates its own clock signal internally. For other embodiments of the present invention, an electronic device other than a processor, such as, for example, a memory component, a controller, a bridge, a digital signal processor or other signal converter, is designed and verified in accordance with an embodiment of the present invention.

Once the clock input signal is divided into multiple global clock signals, there will be some clock skew associated with the phase difference between global clocks. This global clock skew is the result of the fact that different global clocks are driven and buffered by different circuits, having different characteristics according to, for example, their design or manufacture. Global clock skew also is the result of the fact that global clock signal lines are of differing lengths, have differing resistance and capacitance characteristics according to their design or manufacture, and are uniquely routed throughout the processor.

For example, referring to FIG. 1, the global clock signal provided to FUB 102 via global clock signal line 113 may reach FUB 102 before the global clock signal provided to FUB 102 via global clock signal line 112 reaches FUB 102 because clock signal line 113 is shorter than signal line 112. In addition, the global clock signal provided to FUB 104 via global clock signal line 115 may reach FUB 104 before the global clock signal provided to FUB 102 via global clock signal line 113 reaches FUB 102 because clock signal line 115 is shorter than signal line 113. The worst case skew between any two different global clocks is called the global clock skew budget. For an alternate embodiment of the present invention, the global clock skew budget also includes some additional margin. For one embodiment of the present invention, a FUB is, for example, a floating point unit, an arithmetic logic unit, a cache, an execution unit, a retirement unit, an instruction decode unit, a bus interface unit, or some other group of circuits coupled together to implement a particular function within an electronic device.

Once a global clock signal reaches a FUB inside the processor, the clock signal is buffered, divided, driven and distributed among different circuits within the FUB. These multiple clock signals tapped from the global clock signal provided to the FUB are called local clock signals. As is the case with global clocks, there will be some clock skew associated with the phase difference between local clocks. Local clock skew is the result of the fact that different local clocks are driven and buffered by different circuits, having different characteristics according to, for example, their design or manufacture. Local clock skew also is the result of the fact that local clock signal lines are of differing lengths, have differing resistance and capacitance characteristics according to their design or manufacture, and are uniquely routed.

For example, referring again to FIG. 1, the global clock signal provided to FUB 102 via global clock signal line 112 is divided among several local clock signals 121 which are used to time various circuits within FUB 102. The global clock signal provided to FUB 102 via global clock signal line 113 is divided among several local clock signals 122 which are used to time other circuits within FUB 102. Similarly, the global clock signal provided to FUB 104 via global clock signal line 115 is divided among several local clock signals 123 which are used to time circuits within FUB 104. The worst case skew between any two different local clocks tapped from the same global clock is called the local clock skew budget. For one embodiment of the present invention, the local clock skew budget also includes some additional margin.

When verifying proper communication between two sequential circuits coupled by signal lines within a FUB or between two different FUBs of an electronic device, it is necessary to take into account the different timings of the two circuits that result from clock skew of the clock signal between the two circuits. The clock skew between the two circuits is the phase difference between the clock signal to which the first (driving) circuit is timed and the clock signal to which the second (receiving, or sequential) circuit is timed. This clock skew may be due to local clock skew if both the first and second circuits are timed by the same global clock, or the clock skew may be due to both local clock skew and global clock skew if the first and second circuits are timed by different global clocks.

For an embodiment in which hold time checking is performed in a simulated environment before the processor is manufactured, the precise local or global skew corresponding to a particular pair of sequential circuits is unknown. Therefore, to ensure proper communication between the sequential circuits under all potential conditions (within the bounds of manufacturing variation and device operation variation, such as temperature and voltage), the data signal line that connects the first circuit to the second circuit is designed to accommodate the worst case local clock signal skew and, additionally, if necessary, the worst case global clock signal skew. This is the local clock skew budget and total clock skew budget, respectively, wherein the total clock skew budget is equal to the global clock skew budget plus the local clock skew budget. For one embodiment of the present invention, the total clock skew budget also includes some additional margin which may be separate or included in the selected local clock skew budget, the selected global clock skew budget, or both.

For one embodiment of the present invention in which a clock signal inside a processor operates at approximately 200 MHz, the global clock skew budget is approximately 0.3 nanoseconds, and the local clock skew budget is approximately 0.5 nanoseconds, which is 0.3 nanoseconds of pure local skew plus 0.2 nanoseconds added for margin. The total clock skew budget is, therefore, 0.8 nanoseconds. As the frequency of processors and other electronic devices increases, however, clock skew budgets will tend to decrease. For an alternate embodiment of the present invention the local clock skew budget is in the range of approximately 0.1 to 1.0 nanoseconds, and the global clock skew budget is in the range of approximately 0.05 to 0.5 nanoseconds.

Figure 2:
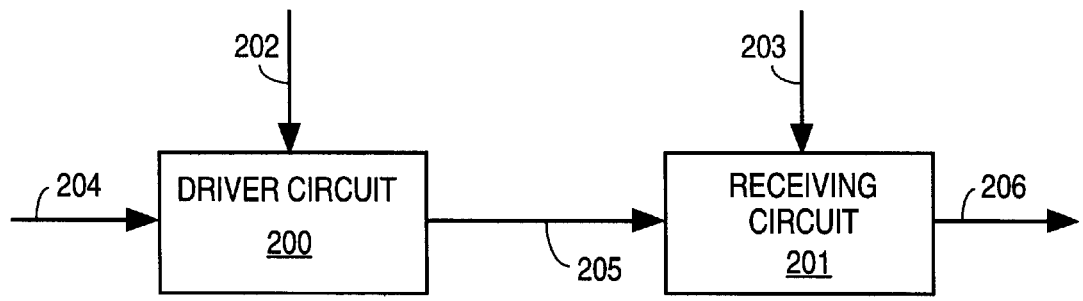
FIG. 2 is two circuits configured to communicate with each other for one embodiment of the present invention.

FIG. 2 is two circuits, 200 and 201 configured to be in communication with each other via data signal 205 which is output from the first driving circuit 200 and input to the second, sequential, receiving circuit 201 via one or more data signal lines that connect the two circuits to each other. Circuit 200 receives signal 204 at its input, and is timed by clock signal 202. Circuit 201 is timed by clock signal 203, and produces signal 206 at its output. In accordance with one embodiment of the present invention, circuits 200 and 201 are latches, the inputs to which are gated by pass gates controlled by clock signals 202 and 203, respectively. For an alternate embodiment, the present invention is implemented to verify the proper operation of any other type of circuit or circuits that are timed by a clock signal such as, for example, a gated NAND gate, a gated NOR gate, another logic gate, a multiplexer, demultiplexer, comparator, inverter, some other buffer, adder, transistor, pass gate, or any other timed or synchronous circuit.

To perform hold time checking to verify proper communication between the sequential circuits 201 and 202 of FIG. 2, the clock signals are time shifted by the global clock skew budget if the clock signals are tapped from different global clocks. No clock shifting is done if the clock signals are tapped from the same global clock. The circuits are then checked against local clock skew buffer, and if the circuits fail to perform properly under these conditions, the circuit design, including the design of the signal lines coupled between the two circuits, is modified by adding delay elements to achieve proper performance.

Because circuit 200 of FIG. 2 is timed by clock signal 202, the output of circuit 200, data signal 205, is also timed to clock signal 202. Due to clock skew, if clock signal 203 arrives later than clock signal 202, data signal 205 can arrive at the input of circuit 201 before the portion of clock signal 203 needed to control the flow of incoming data arrives at circuit 201. This can cause communication problems resulting in the loss of data from data signal 206 because 205 is passed through the open pass gate to output 206.

For example, consider an embodiment in which clock 203 of FIG. 2 controls a pass gate input of a latch of circuit 201 such that the gate is open when the clock is high, allowing data signal 205 to pass through and update the latched value, and the gate is closed when the clock is low, prohibiting signal 205 to enter the latch. When clock signal 202 falls low, circuit 200 sends data signal 205 to circuit 201. Ideally, clock signal 203 falls low at the same time, preventing data signal 205 from entering circuit 201. During this low clock period, circuit 201 sends data signal 206 to another circuit in the electronic device from the output of the latch of circuit 201. Then, when the clock goes high, the latch of circuit 201 accepts data signal 205 at its input, updating its contents by latching the value of data signal 205.

Unfortunately, due to clock skew, if clock signal 203 of FIG. 2 falls low after clock signal 202 falls low, and data signal 205 arrives at the input to circuit 201 before clock signal 203 falls low, data signal 205 is passed into the latch of circuit 201 before circuit 201 is ready to receive signal 205. As a result, circuit 201 latches data signal 205 and passes this data signal on as output signal 206, losing the original value of output signal 206. To prevent this from happening, it is necessary to modify the data signal line (or lines) between circuit 200 and circuit 201 to delay data signal 205 so that the data signal arrives at circuit 201 after clock signal 203 falls low. Delaying the data signal between the two sequential, timed circuits 200 and 201 is accomplished by inserting one or more delay elements, such as, for example, an inverter or other buffer, between circuit 200 and circuit 201 on the data signal line that connects the two circuits and carries at least a portion of data signal 205. The greater the skew between clock signals 202 and 203, the more delay elements that are added to the data signal line between the two circuits to be sure data signal 205 does not arrive at circuit 201 before clock signal 203 switches.

For an alternate embodiment of the present invention, the data signal output from a first circuit and input to a second circuit is delayed by inserting other types of delay elements, such as, for example, resistors, transistors, or logic gates between the two circuits, or by increasing the length or capacitance of the data signal line connecting the two circuits to each other. For another embodiment, the data signal is delayed by slowing the switching speed of the first circuit so that the data signal is not output from the first circuit until such time as it is assured that the data signal will not reach the input (i.e. the clock-controlled pass gate) of the second, sequential circuit until after the clock signal to the second circuit switches, thereby preserving data integrity.

The amount of time the clock signals of FIG. 2 should be shifted when verifying proper communication, during, for example, hold time checking, depends on the clock sources from which clock signals 202 and 203 are tapped. For an embodiment in which signal 202 and 203 are tapped from the same global clock, then there is no need to verify that circuits 200 and 201 will operate properly with respect to any global clock skew because there will not be any global clock skew between the two circuits. However, there will be local clock skew between the two circuits. Therefore, for an embodiment in which clock signals 202 and 203 are tapped from the same global clock, the circuit of FIG. 2 is simply checked against the local clock skew budget, without shifting one clock signal with respect to the other, and proper operation of the second circuit is verified.

Verification includes modifying the design of circuit 200, 201, of FIG. 2, or any signal lines to which they are coupled to ensure proper operation of circuit 201. By ensuring that data signal 205 is delayed long enough (by, for example, adding one or more buffers on the data signal line between the two circuits) so that it always arrives at the input to circuit 201 after clock 203 switches, the worst case scenario of clock signal 202 switching earlier than clock signal 203 is accounted for.

Referring still to FIG. 2, for an embodiment in which signal 202 and 203 are tapped from different global clocks, then both global and local clock skew can affect proper operation of circuit 201. Therefore, for this embodiment verification of proper circuit operation is conducted by shifting clock signal 203 later in time with respect to clock signal 202 by at least the global clock skew budget, and verifying the hold time between the two circuits against the local clock skew budget. If necessary, the design of circuit 200, 201, or any signal lines to which they are coupled, are then modified to ensure proper operation of circuit 201 under this condition.

By ensuring that data signal 205 is delayed long enough (by, e.g., adding one or more buffers on the data signal line between the two circuits) so that it arrives at the input to circuit 201 after clock 203 switches, the worst case scenario of clock signal 202 switching earlier than clock signal 203 is accounted for. Stated another way, the worst case scenario of clock signal 203 switching later than clock signal 202 is accounted for. Note that shifting a first signal earlier in time with respect to a second signal is equivalent to shifting the second signal later in time with respect to the first signal. By shifting clock signal 203 by the global clock skew budget rather than shifting data signal 205 by the global clock skew budget, a significant amount of verification time is saved because there are typically fewer clock signal lines to shift than there are data signal lines.

Figure 3:
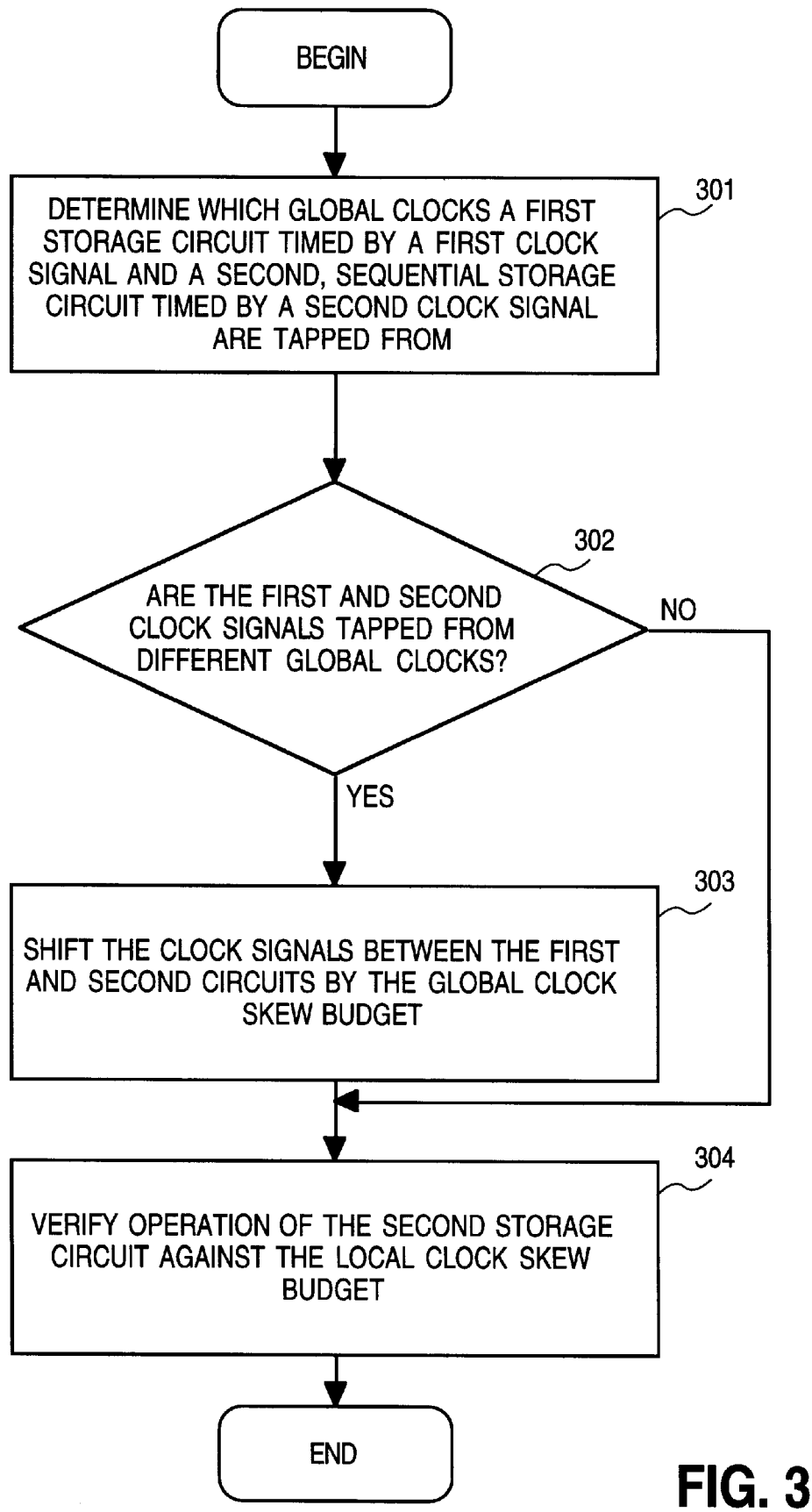
FIG. 3 is a flow chart of a method in accordance with an embodiment of the present invention.

FIG. 3 is a flow chart of a method in accordance with an embodiment of the present invention. At step 301 it is determined which global clocks a first storage circuit timed by a first clock signal and a second, sequential storage circuit timed by a second clock signal are tapped from.

Next, at step 302 of FIG. 3, it is determined whether or not the clock signals are tapped from different global clocks. If the clock signal to the second circuit is timed to the same global clock as the first circuit, the process flow skips down to step 304. If, however, the clock signals to the first and second circuits are timed to different global clocks, then the clock signal between the first and second circuits is time shifted by the global clock skew budget at step 303.

At step 304, verification (or hold time) checking is performed to verify proper operation of the second circuit against the local clock skew budget. Verification step 304 may include adding or subtracting delay elements (depending on whether the data signal is too fast or too slow, respectively, between the two circuits) to the data signal line that connects the first and second circuits, or adjusting the switching speed of the first circuit.

This invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of verifying proper hold time between a first circuit and a second, sequential circuit of an electronic device, the method comprising the steps of:

a. determining which global clocks the first circuit and the second circuit are timed by;

b. shifting a clock signal timing one of the first or second circuits by an amount equal to or greater than a global clock skew budget of the device if it is determined that the first and second circuits are timed by different global clocks; and c. verifying proper operation of the second circuit against a local clock skew budget of the device.

2. The method of claim 1, wherein the step of verifying proper operation of the second circuit comprises a sub-step of inserting a buffer between the first and second circuits to delay a data signal communicated between the first and second circuits.

3. The method of claim 1, wherein the step of verifying proper operation of the second circuit comprises a sub-step of slowing a switching speed of the first circuit.

4. The method of claim 1, wherein the first and second circuits are latches.

5. The method of claim 1, wherein the local clock skew budget is in the range of approximately 0.1 to 1.0 nanoseconds, and the global clock skew budget is in the range of approximately 0.05 to 0.5 nanoseconds.

6. The method of claim 1, wherein the electronic device is a processor.

7. A method of verifying proper hold time between a first circuit timed by a first clock signal and a second, sequential circuit timed by a second clock signal of an electronic device, the method comprising the steps of:

a. determining which global clocks the first clock signal and the second clock signal are tapped from;

b. shifting the second clock signal, with respect to the first clock signal, by an amount equal to or greater than a global clock skew budget of the device if it is determined that the first and second circuits are timed by different global clocks; and c. verifying proper operation of the second circuit against a local clock skew budget of the device.

8. The method of claim 7, wherein the step of verifying proper operation of the second circuit comprises a sub-step of inserting a buffer between the first and second circuits to delay the data signal.

9. The method of claim 7, wherein the step of verifying proper operation of the second circuit comprises a sub-step of slowing a switching speed of the first circuit.

10. The method of claim 7, wherein the first and second circuits are latches.

11. The method of claim 7, wherein the first circuit is contained within a first functional unit block of a processor and the second circuit is contained within a second functional unit block of the processor.

* * * * *